Figure 1:
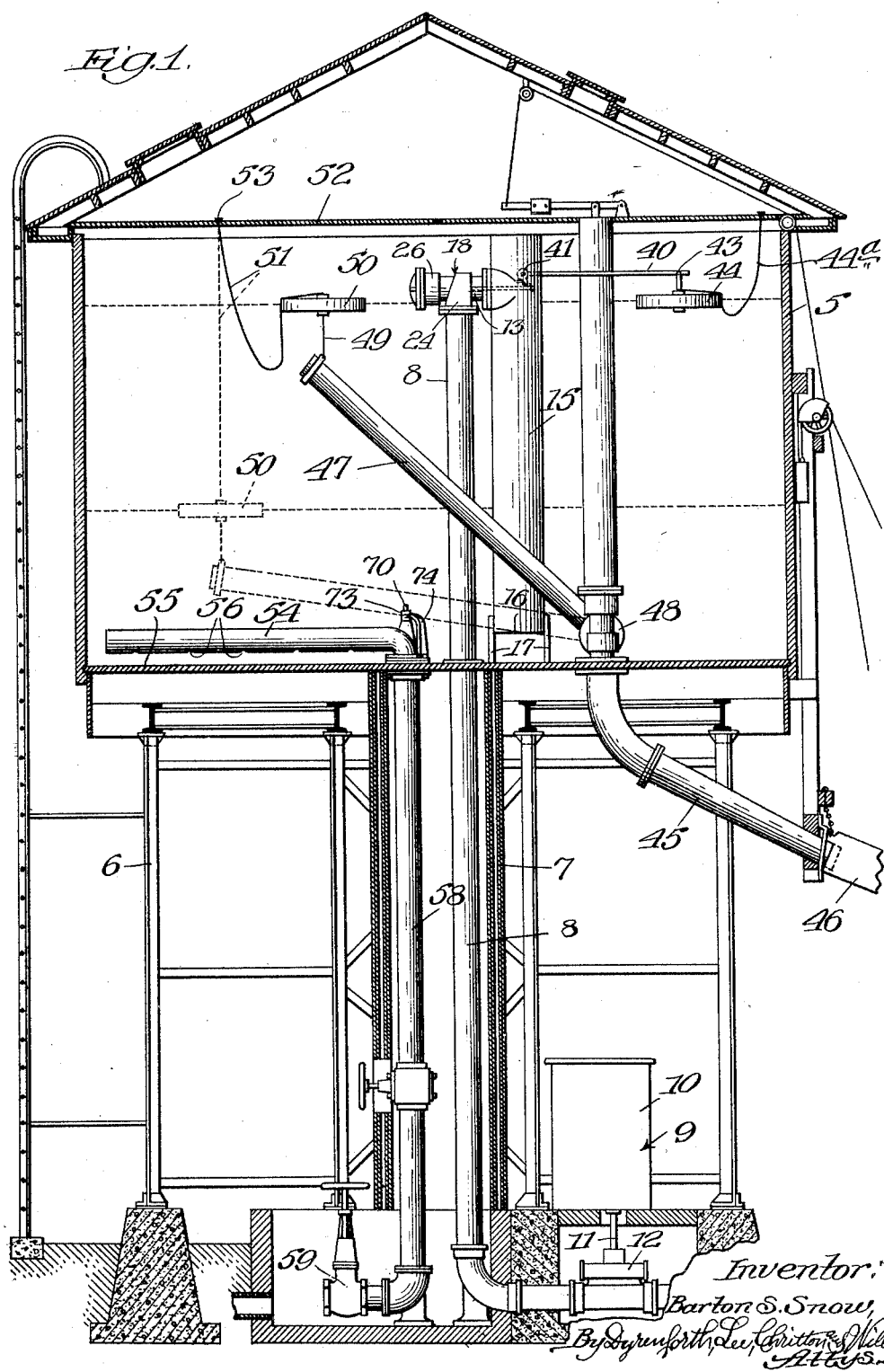

Dec. 3, 1929.    B. S. SNOW    1,738,213
STORAGE TANK
Filed Jan. 3, 1928    2 Sheets-Sheet 1

Inventor:
Barton S. Snow,
By Dyrenforth, Lee, Chritton & Niles,
Attys.

Dec. 3, 1929.  B. S. SNOW  1,738,213
STORAGE TANK
Filed Jan. 3, 1928  2 Sheets-Sheet 2
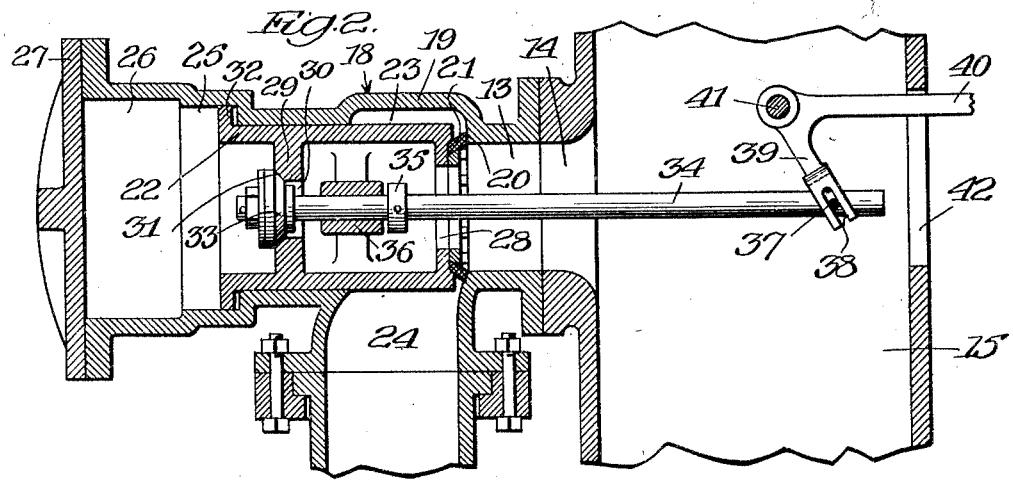
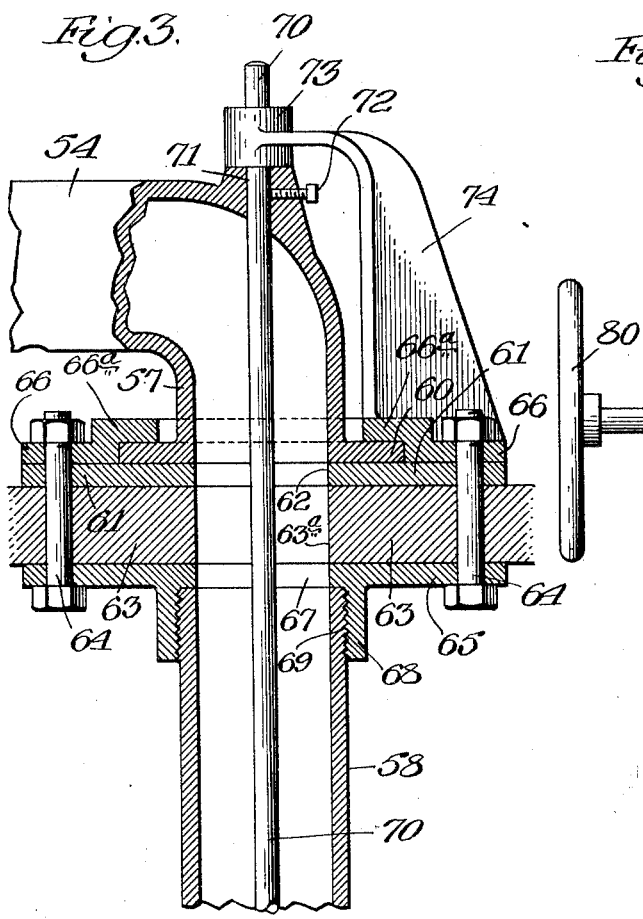
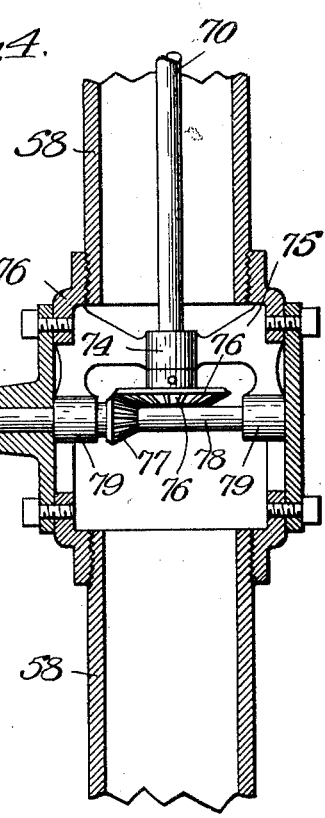
Inventor:
Barton S. Snow,
By Dyrenforth, Lee, Chritton & Wiles,
Attys.

Patented Dec. 3, 1929

1,738,213

UNITED STATES PATENT OFFICE

BARTON S. SNOW, OF WHEATON, ILLINOIS, ASSIGNOR TO T. W. SNOW CONSTRUCTION CO., OF CHICAGO, ILLINOIS, A CORPORATION OF ILLINOIS

STORAGE TANK

Application filed January 3, 1928. Serial No. 244,123.

My invention relates to tanks for storing water, as for example for use in the charging of tenders of locomotives. As to one phase of the invention it relates to the storing of chemically treated water or muddy water containing particles in suspension which gravitate to the bottom of the tank and which it is desired be removed therefrom from time to time without emptying the tank; and as to another phase of the invention it relates to the manner of introducing chemically treated, or muddy, water, into the tank without riling of the clear water therein.

One of my objects is to provide improvements in such tanks to the end that the solid particles therein and gravitated to the bottom of the tank may be removed therefrom with the minimum agitation of the water to the end that saving of water will be effected and by a construction which is of simple and economical form and not subject to leakage.

Another object is to provide in a storage tank for chemically treated water and involving the mixing of the treating material with the water at a point adjacent the tank, for the desired intermixture of the material with the water.

Another object is to provide in a tank wherein solid particles are contained in the water discharged into the tank, for the introduction of the water into the tank with the minimum agitation of the particles which have gravitated to the bottom of the tank and providing for the withdrawal from the tank of the clear water forming the upper portion of the body of the water without disturbing the particles at the bottom of the tank; and other objects as will be manifest from the following description.

Referring to the accompanying drawings:—

Figure 1 is a view in vertical sectional elevation of water storage apparatus embodying my improvements. Figure 2 is an enlarged broken view in sectional elevation of the valve-controlled intake portion of the apparatus. Figure 3 is a similar view of the conduit through which the sediment may be removed from the tank; and Figure 4, a similar view of the mechanism by which a portion of the sediment-removing conduit is actuated.

The particular illustrated embodiment of my invention comprises a main tank portion 5 shown as supported upon a frame-work 6.

Located below the tank 5 is a vertical housing shell 7 through which the water supply pipe 8 extends, the pipe 8 extending upwardly into the tank adjacent the upper end thereof, as shown.

The pipe 8 leads from any suitable source of water under pressure and in the particular arrangement shown wherein suitable chemicals are introduced into the water adjacent to the tank structure to effect the desired treating, as for example, softening thereof, the pipe 8 has associated therewith any suitable apparatus for introducing into the water in its flow to the tank, the desired proportion of treating material. As apparatus for this purpose is well known in the art and commonly used, such an apparatus is illustrated diagrammatically only at 9 in the drawings it being sufficient to state that the apparatus comprises a tank 10 for the treating solution which is in communication, through a pipe 11, with a proportioning mechanism 12 operated by the flow of water through the horizontal portion of the conduit 8 to cause the desired proportionate amount of the treating solution to mix with the water.

The upper end of the conduit 8 opens laterally, as represented at 13, into an inlet 14 in the side of a down-take pipe 15 located in the tank 5 and which preferably is of larger diameter than the pipe 18. The pipe 15 opens at its lower end into the interior of the tank as represented at 16, the pipe 15 to this end being shown as reaching short of the bottom of the tank 5 with depending legs 17 on this pipe reaching to the bottom of the tank.

Interposed in the conduit 8 at its upper end is valve mechanism represented generally at 18 for controlling the flow of the chemically treated water into the tank through the down-take 15. The valve mechanism shown is of a type adapted to automatically control the flow of treated water into the tank and is operated responsive to the height of water in the tank.

The valve mechanism referred to comprises a valve casing 19 forming a portion of the conduit 8, this casing being provided adjacent the outlet 13 with an annular valve seat 20 with which an annular gasket 21 of flexible material carried on the end of a valve proper 22 slidable in the casing 19, cooperates to control the flow of water into the downtake pipe 15. At the rear of the valve seat 20 the casing 19 is cored out to provide an annular channel 23 communicating with the inlet 24 of the casing, the rear end of the casing being of different enlarged internal diameters as represented at 25 and 26, its rear extremity being closed by a cover plate 27.

The valve proper 22, which is a piston valve, contains an opening 28 in its forward end whereby the interior of the valve 22 is in communication at all times with the outlet 13, and is provided at its opposite end with a partition 29 containing an opening 30 therethrough, preferably annularly tapered as represented at 31, and forming a communication between the interior of the piston valve and the rear end of the casing 19, this valve being provided with an annular, outwardly projecting, flange 32 which extends into the rear portion of the casing of larger diameter above referred to. The internal diameter of the portion 25 of the casing 19 is slightly larger than the exterior diameter of the flange portion 32 of the valve 22 to provide a slight clearance between this flange and the wall of the portion 25 of the casing, the flange 32 extending into the portion 25 when the valve 22 is in closed condition.

An auxiliary valve is provided for controlling the opening 30, this valve comprising a valve proper 33 adapted when in closed position to engage the seat 31 and close communication between the interior of the piston valve 22 and the compartment at the rear of the casing 19. This auxiliary valve also comprises a valve stem 34 to one end of which valve 33 is connected, and a collar 35 carried by the stem 34 and spaced from the valve 33, the stem 34 sliding in a bearing 36 located in, and rigid with, the piston 22 in front of, and spaced from, the partition 29. The outer end of the valve stem 34 extends at a laterally disposed pin 37 thereon into the slotted fork portion 38 of one arm 39 of a bell crank lever the other arm of which is represented at 40. The angle portion of this bell crank lever is shown as located inside of the downtake pipe 15 to which it is pivotally connected by a shaft 41 carried by the pipe 15. The arm 40 of the bell crank extends outwardly through a vertical slot 42 in the wall of the pipe 15, its outer extremity being pivotally connected at 43 with a depending float 44 located inside of the tank 5 and adapted to float upon the water in the tank when the water reaches a certain level, a cable 44$^a$ connected with the float 44 limiting the descent of the latter.

The operation of the inlet-controlling apparatus is as follows: Assuming parts of the apparatus to be in the position represented in Figs. 1 and 2 wherein the conduit 8 is closed to the pipe 15, the drawing of water from the tank causes the float 44 to lower which rocks the bell crank in clockwise direction in these figures and forces the valve stem 34 to the left therein. The initial movement of the stem 34 moves the valve 33 away from the seat 31 thereby permitting the water in the rear end of the casing, and under pressure, to flow through the opening 30, thereby releasing the pressure at the rear side of the valve 22. Continued movement of the stem 34 to the left causes the collar 35 to engage the bearing 36 and thereby bodily shift the valve 22 to the left in these figures to open position in which the water flows from the conduit 8 into the downtake pipe 15. As the water rises in the tank it carries the float 44 upwardly therewith and swings the lever toward the position shown in Fig. 2 the initial movement of this lever closing the valve 33 against the seat 31, whereupon the valve 22 is forcibly moved by the stem 34 to the right in Fig. 2. As the valve 22 nears closed position, water from the inlet conduit 8 flowing between the valve 22 and the casing 19 and into the rear end of the latter, the valve 22 loosely fitting in the casing 19, builds up a back pressure therein, this pressure, by reason of the fact that the area exposed by the end of the piston valve 22 and exposed to the water in the rear compartment of the casing 19 and tending to force this valve to the right in Fig. 2, is greater than the area of the valve 22 exposed in this compartment to the water therein tending to force it to the left in this figure, operating to force the valve 22 relatively quickly to its seat, thereby avoiding the subjection of the valve seat and gasket 21 to water flowing therethrough at great velocity with consequent elimination of wire cutting of these parts.

By the provision of the parts of the apparatus as above described, a relatively long course for flow therethrough of the water and the chemical introduced into it, is provided with the advantage that the desired practically complete intermixture of the chemical with the water is effected and sufficient time afforded for the desired action of the chemicals on the water by the time the same discharges directly into the tank 5, and furthermore, by providing the pipe 15 of larger diameter than the conduit 8, the velocity of the water passing through the pipe 15 is reduced so that it enters the lower portion of the tank 5 without substantially agitating the contents of the latter whereby the sediment in the tank remains substantially quiescent.

The tank 5 is provided with means for controlling the discharge of the chemically treated clear water therefrom, through a pipe 45 shown as provided at its discharge end with a movable spout section 46 and provided with any suitable valve mechanism controlling the flow of water to the pipe 45 as for example as disclosed in United States Letters Patent No. 1,621,959, granted March 22, 1927.

The flow of water from the tank 5 to the discharge pipe 45, under the control of the valve mechanism referred to, is through a pipe 47 located in the tank with its lower end swiveled, at 48, to the inlet end of the valve casing as disclosed in the Letters Patent referred to, the outer end of the pipe 47, which is open, being attached, by a connector 49, with a float 50 located within the tank 5 and adapted to float upon the water therein and maintain the upper, inlet, end of the pipe 47 submerged in the clear water in the tank at a slight distance below the top of the water. The float 50 is shown as connected with a cable 51 which extends through an opening in the cover 52 of the tank 5 and is provided with a button 53 located above this cover portion, the length of this cable being such that the pipe 47 may not lower at its inlet below a predetermined point, as for example as shown by dotted lines in Fig. 1.

It will be noted from the foregoing that the water supplied by the pipe 47 is taken from the body of the water in the tank 5 between the upper and lower zones thereof, thereby ensuring the supplying of clear, treated, water, to this pipe, the withdrawal of the water from the tank at an intermediate zone, as stated, avoiding the draining into the pipe 47 not only of the solid particles which have gravitated to the bottom of the tank, but also such scum and other like particles as may float on the surface of the water.

The construction shown also involves means under the control of the operator, and at will, to remove such solid particles as may have precipitated to the bottom of the tank, these means, according to the preferred illustrated embodiment of the invention, comprising a pipe 54 which is located in the tank 5 and extends substantially horizontally above, and in slightly spaced relation to, the bottom 55 of the tank. The pipe 54 is provided at intervals, along its length, with downwardly opening apertures 56 for communication of the interior of the pipe 54 with the interior of the tank 5. The pipe 54 is provided with a depending elbow portion 57 at which it is swiveled on a substantially vertical axis, to adapt the pipe 54 to be swung in a substantially horizontal plane, and at which portion it opens downwardly into a pipe 58 which leads downwardly through the shell 7 to any suitable point of discharge, as for example to a sewer or drain under the control of a shut-off valve represented at 59.

The swivel mounting referred to of the pipe 54 is preferably effected by providing the lower open end of the elbow 57 with an annular peripheral flange 60 at which the elbow rests upon a plate 61 and in registration with an opening 62 therethrough. The plate 61 rests upon the plank portion 63 of the tank bottom 55 with its opening 62 in registration with an opening 63$^a$ in the planking and is securely held thereto to make a tight joint, by an annular series of bolts 64 which pass through the planking 63 and plate 61 and also through a plate 65 positioned in engagement with the underside of the planking 63 and a ring 66 superposed on the plate 61, which is provided about its inner periphery with an upwardly offset annular flange 66$^a$ seating upon the flange 60, the plate 63 containing an opening 67 therethrough in registration with the opening 63$^a$. The plate 63 is provided with a centrally disposed boss 68 presenting an internally threaded socket 69 into which the upper threaded end of the pipe 58 is screwed.

It will be understood that by providing the swivel connection as stated the use of stuffing boxes is avoided without any danger of leakage from the tank.

Means are provided whereby the operator may swing the pipe 54 about its swivel connection substantially throughout a complete circle, to drain the sludge from the bottom of the tank practically throughout the extent of the latter. These means in the particular construction shown comprise a rod 70 extending upwardly through the pipe 58, the elbow portion 57 and the other parts interposed therebetween, the upper end of this rod extending at its upper end through an opening 71 in the elbow, to which it is rigidly secured as by a set screw 72, and through a bearing 73 formed on the upper end of a bracket 74 carried by, and projecting upwardly from, the ring 66. The lower end of the rod 70 is journalled in the bearing portion 74 of a spider frame 75 rigidly secured in a casing 76 forming a section of the pipe 58, the lower extremity of the rod 70 being provided with a bevel gear 76 which meshes with a bevel pinion 77 secured to a shaft 78 journalled in bearings 79 provided on the spider frame 75. The shaft 78 extends outwardly through a side of the casing 76 and is provided with a hand wheel 80 by which the rod 70 may be rotated and the pipe 54 thus swung horizontally at its swivel connection with the tank.

When it is desired to remove the deposited solid material in the bottom of the tank 5, the valve 59 is opened and the operator slowly swings the pipe 54, at its swivel connection with the tank, to cover practically the entire area of the bottom of the latter, the water laden with this material discharging from the bottom of the tank into the pipe 54 and thence through the pipe 58 to the drain.

It will be readily understood from the foregoing that the solid particles which have gravitated to the bottom of the tank may be removed therefrom to an exceedingly effective degree, by the provision of the movable discharge pipe 54 and without creating undue agitation of the water, with the manifest advantage.

By the arrangement shown and described, the water, containing particles, whether precipitates produced by the action of water-treating chemicals on the water, mud, or other particles, flows quietly into the body of water in the tank, thereby avoiding agitation of the particles lying at the bottom of the tank, and by drawing the water for use from the upper portion of the body of water, clear water only is discharged from the tank and without agitation of the gravitated sediment, whereby the mud for separate settling tanks is avoided.

While I have illustrated and described a particular construction embodying my invention, I do not wish to be understood as intending to limit it thereto as the same may be variously modified and altered without departing from the spirit of my invention.

What I claim as new, and desire to secure by Letters Patent, is:

1. A water storage apparatus comprising a tank for the water, a pipe for removing sediment from said tank, said pipe extending at its inlet adjacent the bottom of the tank and having a depending outlet formed with an outwardly extending swiveling flange, said tank having an outlet portion into which the outlet of said pipe discharges, and means on the tank and engaging said flange for swiveling said pipe to said tank for rotation relative to the outlet of said tank.

2. A water storage apparatus comprising a tank for the water, a pipe for removing sediment from said tank, said pipe extending substantially horizontally and containing downwardly opening inlet apertures along its length and having a depending outlet formed with an outwardly extending swiveling flange, said tank having an outlet portion into which the outlet of said pipe discharges, and means on said tank and engaging said flange for swiveling said pipe to said tank for rotation relative to the outlet of said tank.

BARTON S. SNOW.